United States Patent [19]

Bilodeau et al.

[11] Patent Number: 4,895,423

[45] Date of Patent: Jan. 23, 1990

[54] FABRICATION TECHNIQUE FOR LOW-LOSS FUSED TAPER DIRECTIONAL COUPLERS AND PRESSURE SENSOR PRODUCED THEREBY

[75] Inventors: Francois Bilodeau, Nepean; Kenneth O. Hill, Kanata; Sylvain Faucher, Hull; Derwyn C. Johnson, Nepean, all of Canada

[73] Assignee: Canadian Patents and Development Limited, Ontario, Canada

[21] Appl. No.: 293,074

[22] Filed: Jan. 3, 1989

[30] Foreign Application Priority Data

Jan. 11, 1988 [CA] Canada .................................. 556261

[51] Int. Cl.⁴ .......................... G02B 6/26; G01D 5/34; C03B 23/20; G01L 1/24
[52] U.S. Cl. ................. 350/96.15; 350/96.10; 350/96.16; 350/96.29; 350/96.30; 350/320; 250/227; 250/231 P; 250/231 R; 65/4.1; 65/4.2; 73/800
[58] Field of Search ............... 350/96.10, 96.15, 96.16, 350/96.29, 96.30, 320; 250/227, 231 P, 231 R; 65/4.1, 4.2; 73/800

[56] References Cited

U.S. PATENT DOCUMENTS

| | | | |
|---|---|---|---|
| 4,078,432 | 3/1978 | Stewart | 350/96.21 |
| 4,360,247 | 11/1982 | Beasley | 350/96.15 |
| 4,387,954 | 6/1983 | Beasley | 350/96.15 |
| 4,449,781 | 5/1984 | Lightstone et al. | 350/96.15 |
| 4,471,474 | 9/1984 | Fields | 350/96.15 X |
| 4,482,203 | 11/1984 | Stowe et al. | 350/96.15 |
| 4,591,372 | 5/1986 | Bricheno et al. | 65/4.2 |
| 4,634,858 | 1/1987 | Gerdt et al. | 250/227 |
| 4,647,146 | 3/1987 | Karr, III et al. | 350/96.15 |
| 4,725,728 | 2/1988 | Brininstool et al. | 250/227 |
| 4,726,643 | 2/1988 | Imoto et al. | 350/96.16 |
| 4,756,589 | 7/1988 | Bricheno et al. | 350/96.15 |
| 4,763,272 | 8/1988 | McLandrich | 350/96.15 X |
| 4,779,945 | 10/1988 | Hill et al. | 350/96.15 |
| 4,822,128 | 4/1989 | Imoto et al. | 350/96.16 |

Primary Examiner—William L. Sikes
Assistant Examiner—Brian M. Healy
Attorney, Agent, or Firm—Pascal & Associates

[57] ABSTRACT

A method of forming a single mode biconical fiber optic coupler comprising holding 2 or more optical fibers parallel to and in contact with each other at spaced apart locations, exerting equal tension in opposite directions to the fibers at said spaced apart locations to stretch the fibers, fusing the fibers over a waist region, and scanning the tip of a flame from a microtorch back and forth along the fibers at a speed which is at least five times the speed of stretching of the fibers. This results in an overcoupled low loss coupler, a pressure or a temperature sensor, comprised of at least a pair of monomode optical fibers fused and parallel at a stretched waist portion, each having biconical tapers at opposite ends of the waist portion, the coupler having exhibited at least about 500 power transfer cycles during stretching formation of the waist portion.

16 Claims, 4 Drawing Sheets

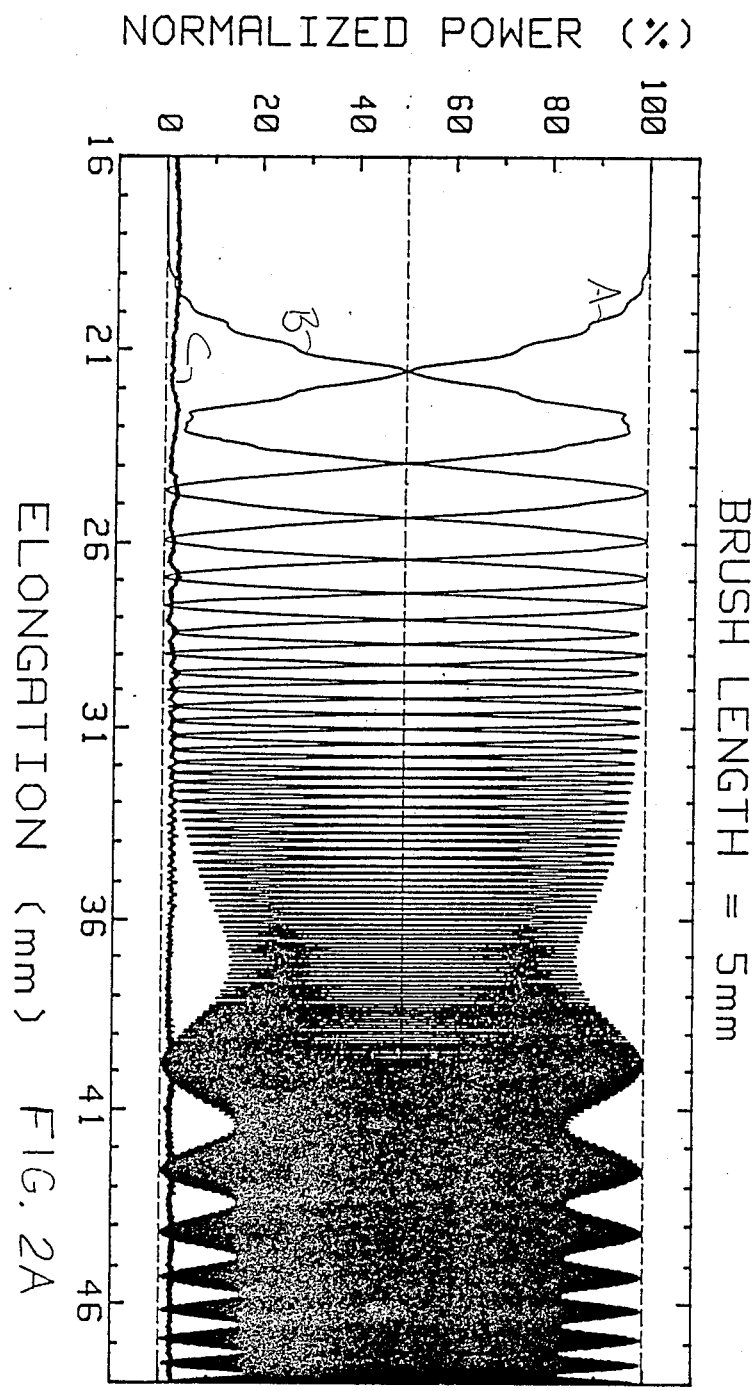

FABRICATION TECHNIQUE FOR LOW-LOSS FUSED TAPER DIRECTIONAL COUPLERS AND PRESSURE SENSOR PRODUCED THEREBY

BACKGROUND OF THE INVENTION

This invention relates to fused overcoupled monomode optical fiber couplers and in particular to a method of producing such couplers and to a pressure sensor produced thereby.

Fused monomode optical fiber couplers are typically produced by heating a pair of optical fibers placed in contact, and pulling the fibers, whereby they first fuse at the periphery of their cladding, then neck down to form conical tapers. While the cladding is reduced in diameter at the waist region, the core is also reduced to the point of virtual disappearance. As an optical signal is carried by one of the fibers into the waist region, it leaves the core and becomes carried by the cladding. Coupling occurs into the second fiber in the waist region where the fibers are fused and the optical signal reaches the cladding periphery.

As the fibers are stretched, expanding the length of the waist region, the light energy coupled into the second fiber increases to a maximum, and then decreases to a minimum, cycling between maxima and minima. This phenomenon is described in U.S. Pat. No. 4,591,372 dated May 27, 1986 and assigned to Standard Telephones and Cables Public Ltd. Co. The phenomenon provides means for tuning by means of the coupler, thereby facilitating their use to form multiplexers.

In that patent the technique is described by which a pair of optical fibers are twisted and are held between clamps. In order to increase the length of the coupling region, a microtorch is held at a location between the clamps, and the clamps are cycled back and forth so that a longer region of the fibers is heated than if the clamps were held stationary. The forward clamp is moved faster than the rearward clamp, in order to effect stretching. As the clamps change direction, the rearward clamp becomes the forward clamp, and it moves faster than the other clamp.

It may be seen from FIGS. 5 and 6 of that patent that approximately three cycles of tuning can be obtained using the disclosed system.

It is desirable, however, to form long couplers, to increase the dependence of the coupling ratio on wavelength, and to increase the sensitivity of the coupling ratio to environment parameters.

SUMMARY OF THE INVENTION

The present invention is a method for forming a fused, overcoupled, monomode biconical coupler in which several thousand cycles can be achieved. Indeed, the cycling variation rate, i.e. the slope of the variation becomes so high, that we have discovered that it can be used to form a novel pressure sensor. This will be described in more detail below. The method permits precision control of the volume of glass heated, and yields couplers with low excess loss.

Whereas the Standard Telephones & Cables method utilized twisted optical fibers, the present invention utilizes initially parallel optical fibers. Whereas the Standard Telephones & Cables method traverses over the microtorch only four or five times to stretch the fibers 2–5 cm (and therefore results from a very slow scan), in the present invention the microtorch traverses 100 times or more to produce a 5 cm length. While the Standard Telephones & Cables structure performs only four to five traverses of the microtorch to provide e.g. two tuning cycles, the present invention utilizes about sixty microtorch traverses for the same number of timing cycles.

Further, the Standard Telephones & Cables structure pulls one end of the cable, then the other, reversing at the ends of the traverse. Hot spots at the ends of the traverse are said to occur, requiring the traverse to cause the microtorch to reverse in the shoulder area of what has already been heated. In applicant's invention such precautions are not necessary, due to the speed of the flame relative to the stretching, e.g. the flame "brushes" the fibers at a minimum of five and typically ten times the speed of stretching. The fibers are subjected to equal tension (by means of pulling motors) in each direction. Typically the flame is scanned at 0.4 mm per second, while the motors pull at 0.02 mm per second.

Using a particular type of flame, nozzle size, etc. in addition to the above, applicant has formed a significantly improved coupler, which, as noted above, can exhibit several thousand coupling cycles while being stretched, while maintaining low loss typically less than 0.2 dB, and which can be used as a pressure or temperature sensor as will be described below.

In a preferred form of the invention, a coupler is formed by the method of forming a single mode biconical fiber optic coupler comprising holding 2 or more optical fibers parallel to and in contact with each other at spaced apart locations, exerting equal tension in opposite directions to the fibers at the spaced apart locations to stretch the fibers, and after fusing the fibers at a waist region, scanning the tip of a flame from a microtorch back and forth along the fibers at a speed which is at least five times the speed of stretching of the fibers.

An embodiment of the invention is an overcoupled low loss optical coupler comprising two or more monomode optical fibers fused and parallel at a stretched waist portion, each having biconical symmetrical tapers at opposite ends of the waist portion, the coupler having exhibited several thousand power transfer cycles during stretching formation of the waist portion.

A further embodiment of the invention is a pressure sensor comprising an overcoupled optical coupler comprising a pair of monomode optical fibers fused and parallel at a stretched waist portion, each having biconical tapers at opposite ends of the waist portion, the coupler having exhibited at least about 500 power transfer cycles during stretching formation of the waist portion, apparatus for applying an optical signal to one end of one fiber, and apparatus for monitoring an optical signal from the other end of one or both of the fibers, whereby pressure variation about the coupler can be monitored as a variation in coupling between said one and the other fiber.

More generally, an embodiment of the invention is an ambient pressure sensor comprised of an overcoupled fused biconical fiber optical coupler formed of a pair of parallel similar or dissimilar fibers, having exhibited at least about 500 power transfer cycles during stretching formation thereof.

BRIEF DESCRIPTION OF THE DRAWINGS

A better understanding of the invention will be obtained by reference to the detailed description below, in conjunction with the following drawings, in which.

DETAILED DESCRIPTION OF THE INVENTION

Figure 1:
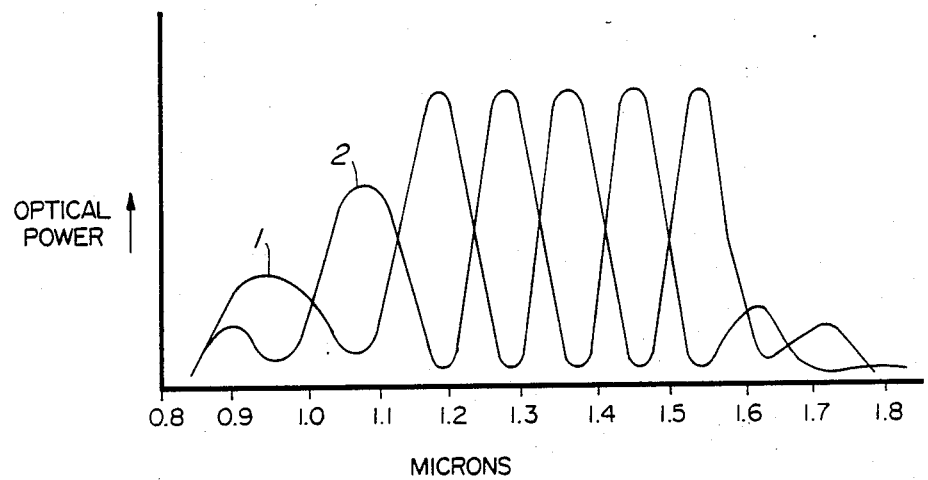
FIG. 1 shows the spectral characteristics of a coupler in accordance with the prior art.

Turning first to FIG. 1, coupling power is illustrated in accordance with a coupler of the prior art such as that described in U.S. Pat. No. 4,591,372. With an optical signal applied to the end of a first fiber, the trace 1 corresponding to the optical signal received at its other end is shown. It may be seen that peaks occur at about 1.17, 1.35 and 1.55 microns, and little or no power is transferred at about 1.05, 1.28, 1.45, 1.62 and beyond. The trace 2 is observed from the end of the second fiber, and the maxima and minima of the observed power occur in inverse to those of trace 1. The traces represent an approximately three cycle coupler. Applicant has tested such a coupler as a pressure sensor and has found that large pressure variations will not cause even a 1% change in coupled power.

The present inventors, on the other hand, have with the use of their novel method achieved several thousand cycles of power transfer during fabrication, and thus a several thousand cycle coupler can be produced. Where such a coupler is used as a pressure sensor, by inserting the coupler into a vessel in which the pressure is to be detected, applying an optical signal into one optical fiber, and detecting the output optical power from either the first or second fiber, a 1,200 cycle coupler has transferred power through a full cycle with a pressure variation of 55 p.s.i. A 2,000 cycle coupler has transferred power over a full cycle with a pressure differential of only 17.6 p.s.i. Clearly the use of a coupler having a large number of cycles can provide a pressure sensor having very high sensitivity. Such a coupler has also exhibited sensitivity to temperature. Thus temperature changes can also cause power transfer, allowing the coupler to be used as a temperature sensor.

Figure 2A:
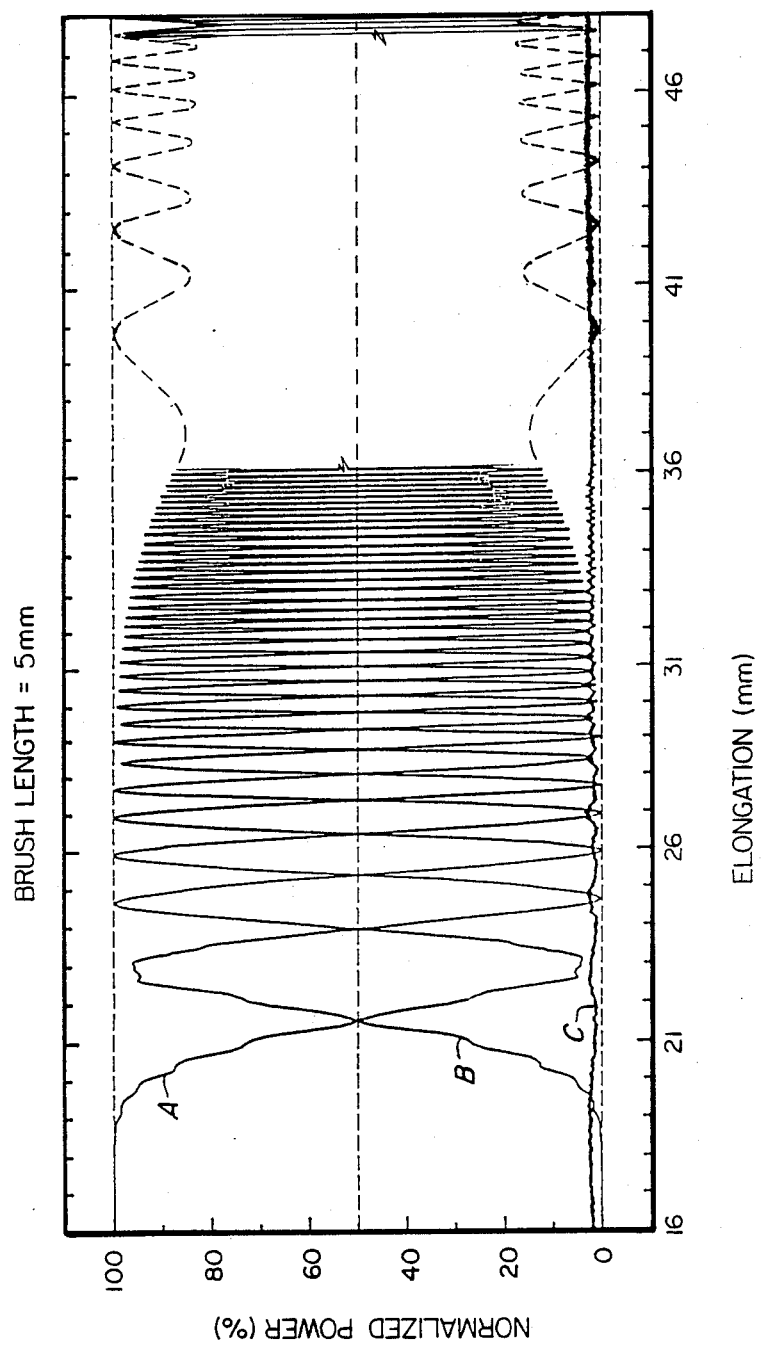
FIG. 2A is a graph illustrative of the cycling (e.g. optical coupling) observed while carrying out the method of the present invention.
Figure 2B:
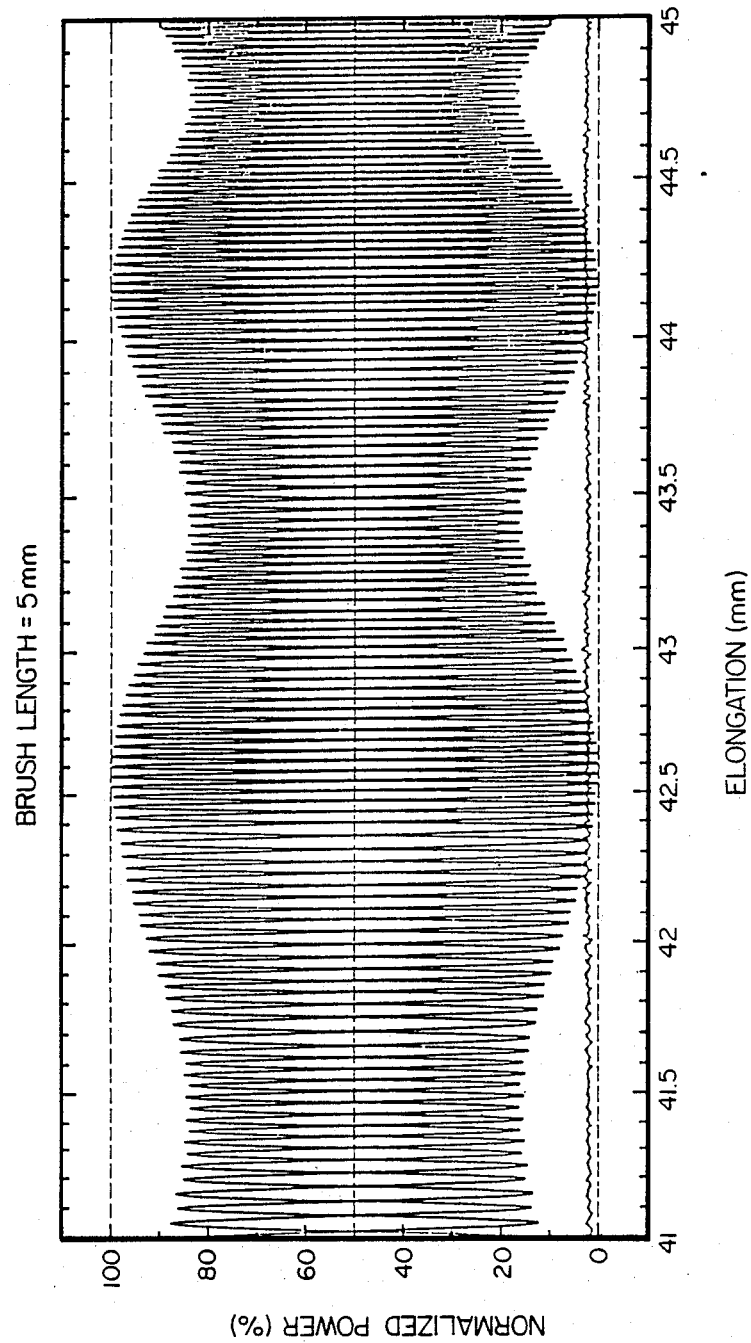
FIG. 2B is an enlargement of part of the graph of FIG. 2A along the horizontal axis.

FIG. 2A illustrates the normalized power measured at the output of two fibers, the two complementary traces representing power received from the output of the two fibers respectively being labelled A and B, and the bottom trace C representing the loss where the coupler is elongated between 16 and 48 mm. FIG. 2B is an expansion of the trace between 41 and 45 mm elongation, showing that the cycling not evident due to resolution of the trace in FIG. 2A is in fact maintained. The loss is clearly 0.2 dB or less, i.e. 5% or less, over the entire stretching interval. This is believed to be a unique result. FIG. 2A is a copy of an actual trace of about 150 cycles of a 2,000 cycle coupler, as displayed on a computer display during fabrication.

Figure 3:
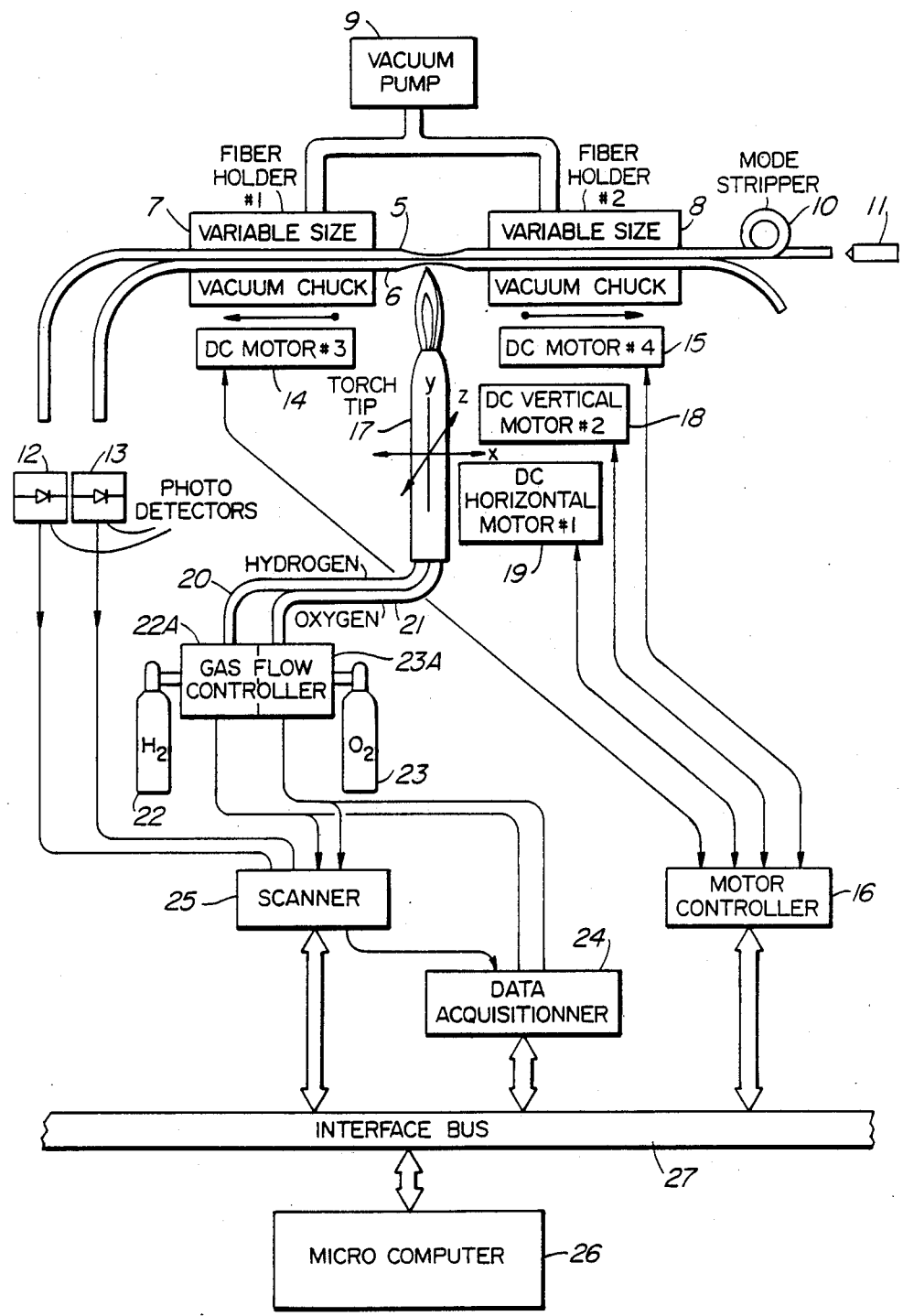
FIG. 3 is a schematic diagram illustrating apparatus used in the method of the present invention.
Figure 1:
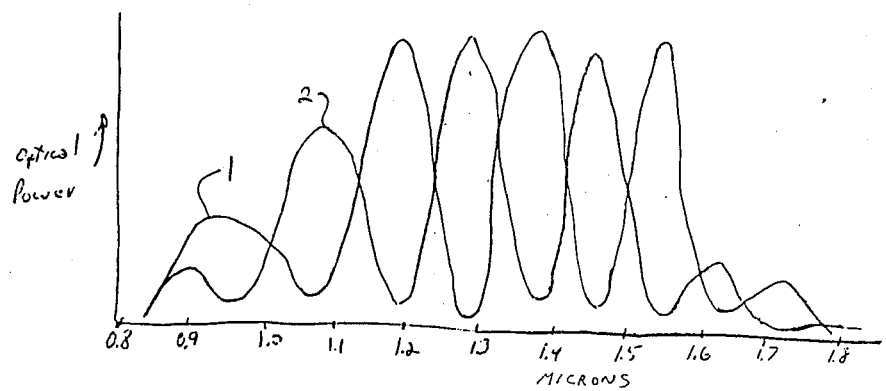
Figure 4:
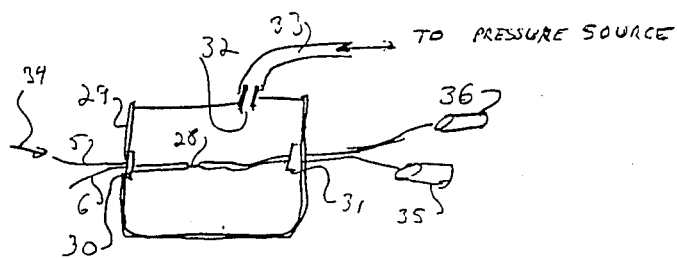
Figure 2B:
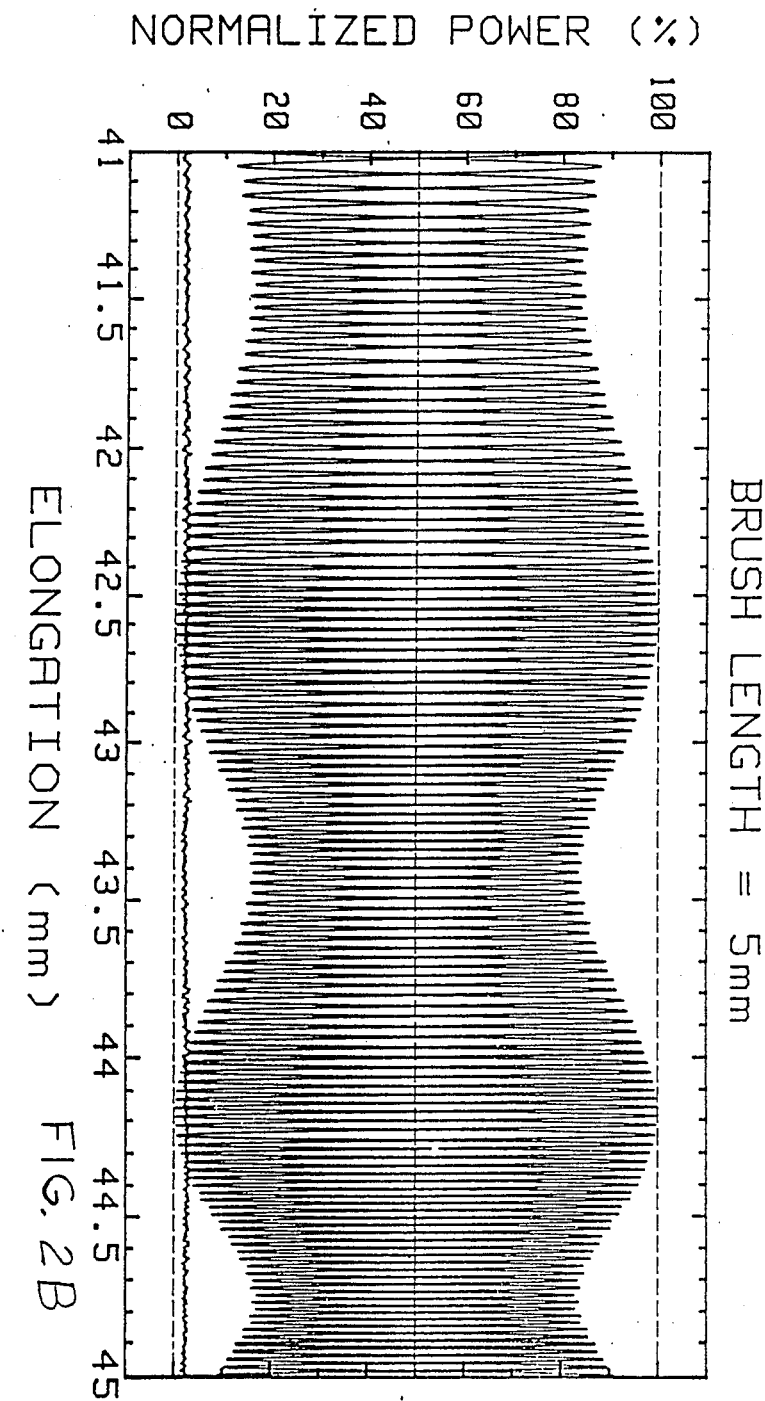
Figure 3:
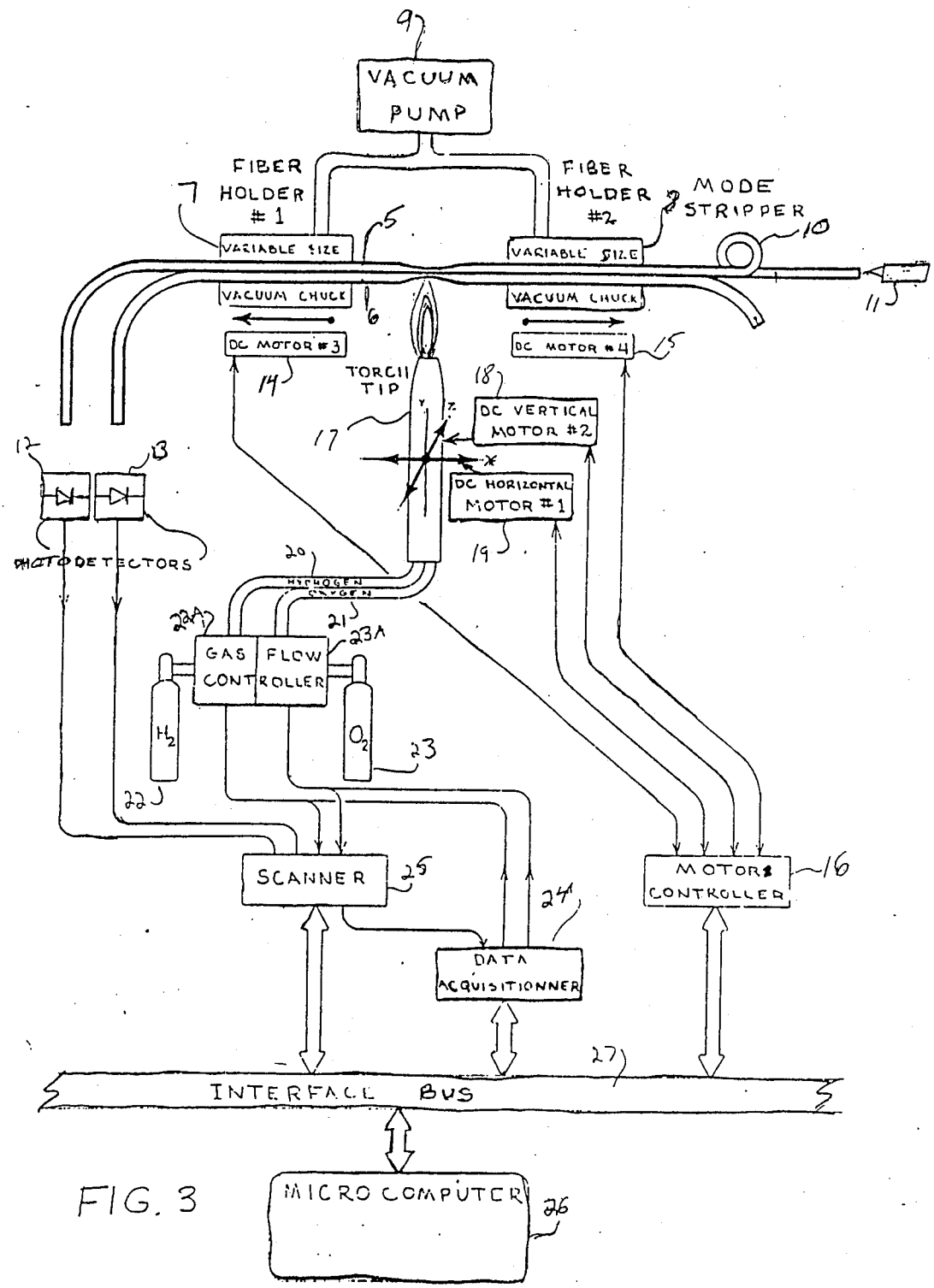

FIG. 3 illustrates apparatus used to carry the method of the present invention. At least a pair of identical or dissimilar fibers 5 and 6 are placed parallel to each other (it is important that they should not be twisted) and are held between a pair of spaced vacuum chucks 7 and 8. A vacuum pump 9 operates the vacuum chucks in a well known manner.

The optical fibers are monomode or low mode number, one of which contains a mode stripper 10 to ensure that it operates at monomode or low mode number. A light source 11 illuminates the end of the fiber containing the mode stripper. A pair of photodetectors 12 and 13 receive the light emitted from the other ends of the fibers. Clearly with the structure so far described, photodetector 12 will receive the light from light source 11 and photodetector 13 will be dark.

Each vacuum chuck is moved by a DC motor 14 and 15 respectively, which motors are controlled by motor controller 16. The motor controller causes motors 14 and 15 to drive against each other, applying tension to both fibers together.

A microtorch 17 is located with its flame tip just touching the fibers, midway between the chucks 7 and 8.

The microtorch is operated by a vertical control motor 18, controlling the distance of the flame of the fibers, and a DC horizontal scanning motor 19, which moves the torch back and forth horizontally. Both motors 18 and 19 are controlled by motor controller 16.

A source of hydrogen 22 and oxygen 23 flows through tubes 20 and 21 respectively to the microtorch 17. Gas flow controllers 22A and 23A control the flow rate of the hydrogen and oxygen respectively, and are controlled from a data acquisitioner 24. Feedback from the gas flow controllers 22A and 23A and photodetectors 12 and 13 are applied to scanner 25. A microcomputer 26 is connected to scanner 25 and data acquisitioner 24 and motor controller 16 via an interface bus 27.

The microcomputer operates the motor controller and gas flow, in accordance with the criteria to be described below, and receives feedback as to the actual gas flow and optical coupling from the gas flow controllers and photodetectors. It can thus monitor how many power transfer cycles the coupler has undergone and the realtime loss as the coupler is fabricated.

The first step in forming the coupler is to fuse the fibers. The horizontal motor 19 is caused to move the torch horizontally preferably at a speed 15 times faster than the speed of stretching the fibers, but can be at a lower multiple. However it is preferred to move the flame during fusing at a high multiple of the speed of stretching in order to keep tension on the fibers. Each of the DC motors 15 and 16 move in a direction opposite to the other preferably at about 0.005 mm per second. At the same time the motor 19 should cause the torch to move at about 0.15 mm per second.

In order to fuse the fibers, a high pressure flame is used, of preferably 144 ml per minute of hydrogen and 64.2 ml per minute of oxygen, giving a total of 208.2 ml per minute of gas, into the torch. With a #4 tip nozzle size, a narrow flame will result. The tip of the flame should be controlled by the vertical control motor 18 to just touch the fibers. This will heat approximately 2 mm length of fiber. The length fused should be slightly longer than the length brushed during stretching.

The stretching phase then begins. The flame scanning rate should be a minimum of five times the stretching speed, and preferably ten times, as described above. Now a lower pressure flame is used, making the flame much wider. The oxygen is shut off, and the hydrogen pressure used should be e.g. 130 ml pressure per minute. Again the DC vertical control motor 2 should adjust the height of the microtorch so that the top of the flame just touches or "brushes" the fibers at the same time the DC motors 14 and 15 exert equal and opposite tension. The fiber will neck down, forming a monomode biconical coupler. The photodetectors will detect cycling as shown in FIGS. 2A and 2B.

It should be noted that in the method described in U.S. Pat. No. 4,591,372, four to five traverses of the flame are used to stretch the fibers 2-5 cm, and therefore the flame or fiber movement must be very slow. In applicant's invention sixty or more scanning cycles are used to result in the first two power transfer cycles. To stretch the waist portion e.g. 5 cm, there will be one hundred or more traverses of the torch tip. Thus the scanning speed is at least an order of magnitude greater in the present invention than in the aforenoted prior art.

Using the present invention, of e.g. 150 scanning cycles of the torch, and a scanning distance of 4.5 mm, a coupler exhibiting 2,000 coupling cycles was created with a stretch of the fibers of e.g. 6 cm. A starting outside diameter of two fibers of e.g. 250 microns across the widest diameter was decreased to the order of 1 micron outside diameter. Other samples were decreased in diameter to even as narrow as 0.5 micron.

The present invention has not exhibited hot spots which were described in U.S. Pat. No. 4,591,372. Accordingly the flame need not scan up the shoulders of the previously scanned range. However in case the user wishes to absolutely ensure that end point hot spots should not be encountered, the motors 18 and 19 can be programmed to move the flame away from the fibers adjacent the ends of the scanning cycles. The flame need not be moved away from the fibers more than 1 mm.

Figure 4:
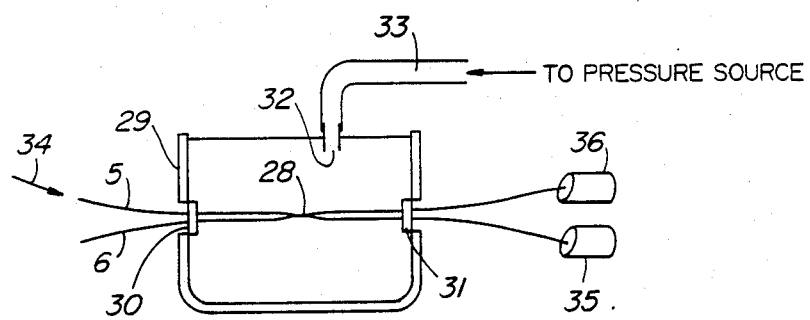
FIG. 4 is a schematic diagram illustrating a pressure sensor formed using the present invention.

FIG. 4 illustrates a several thousand cycle optical coupler formed by the method of the present invention and used as a pressure sensor. Such a coupler 28 is contained within a sealed pressure vessel 29. Fibers 5 and 6 pass through seals 30 and 31. A port 32 is connected via a pipe 33 to a pressure source.

An optical signal, illustrated by arrow 34 is coupled to one of the fibers 5. Optical detectors 35 and 36 detect optical signals received at the output of fibers 5 and 6 at the opposite end of coupler 28.

As the pressure increases within the vessel, the optical power received by optical detectors 35 and 36 will vary. As indicated earlier, for a 2,000 cycle coupler, a pressure change of 17 p.s.i. has been found to tune the coupler through one complete power transfer cycle, and in a 1,200 cycle coupler, a pressure change of 55 p.s.i. has been found to vary the coupling through one complete cycle.

The sensitivity of the pressure detector appears to increase with a numerically larger cycle coupler. In order to obtain reasonable sensitivity, it is therefore preferred that the coupler should have passed through at least 500 power transfer cycles during fabrication.

A person skilled in the art understanding this invention may now conceive of variations or other embodiments using the principles described herein. All are considered to be within the sphere and scope of this invention as defined in the claims appended hereto.

We claim:
1. A method of forming a single mode biconical fiber optic coupler comprising holding 2 or more optical fibers parallel to and in contact with each other at spaced apart locations, exerting equal tension in opposite directions to the fibers at said spaced apart locations to stretch the fibers, fusing the fibers over a waist region, and scanning the tip of a flame from a microtorch back and forth along the fibers at a speed which is at least five times the speed of stretching of the fibers.

2. A method as defined in claim 1 in which the microtorch contains an approximately #4 nozzle tip, and including the steps of applying a combination gas of about 144 ml/min. of hydrogen with about 64.2 ml/min. of oxygen to the microtorch to form the flame while the flame moves over in excess of about 4.5 mm of fibers to fuse them, then applying only about 130 ml/min. of hydrogen to the microtorch while the flame scans about 4.5 mm length of fiber at least 150 times.

3. A method as defined in claim 2 in which each end of the pair of fibers is pulled at about 0.02 mm/second, while the flame scans the fibers at about 0.4 mm/sec.

4. A method as defined in claim 1, 2 or 3 including applying a monomode or low mode optical signal to one end of one of the fibers, monitoring the optical power emitted at the end of one or both of the pair of fibers, and terminating formation of the coupler when the optical power monitored has passed through at least 500 cycles of power maxima and minima.

5. A method as defined in claim 1, 2 or 3 including applying a monomode or low mode optical signal to one end of one of the fibers, monitoring the optical power emitted at the end of one or both of the pair of fibers, and terminating formation of the coupler when the optical power monitored has passed through several thousand cycles of power maxima and minima.

6. A method as defined in claim 1, 2 or 3 including the step of moving the microtorch away from the optical fibers adjacent the ends of each scanning cycle during stretching of the fibers.

7. An overcoupled low loss optical coupler comprising at least a pair of monomode optical fibers fused and parallel at a stretched waist portion, each having biconical tapers at opposite ends of the waist portion, the coupler having exhibited at least about 500 power transfer cycles during stretching formation of the waist portion.

8. An overcoupled low loss optical coupler comprising at least a pair of monomode optical fibers fused and parallel at a stretched waist portion, each having biconical tapers at opposite ends of the waist portion, the coupler having exhibited several thousand power transfer cycles during stretching formation of the waist portion.

9. An optical coupler as defined in claim 7 or 8 in which the waist portion is approximately 6 cm in length and 1 micron or smaller in diameter.

10. An overcoupled fused biconical fiber optical coupler formed of at least a pair of parallel similar or dissimilar fibers, having exhibited at least about 500 power transfer cycles during stretching formation thereof.

11. An overcoupled fused biconical fiber optical coupler formed of at least a pair of parallel similar or dissimilar fibers, having exhibited several thousand power transfer cycles during stretching formation thereof.

12. A coupler as defined in claim 7, 8 or 10 having exhibited a loss of 5% less over the entire stretching formation thereof.

13. A pressure sensor comprising an overcoupled optical coupler comprising a pair of stretched waist portion, each having biconical tapers at opposite ends of the waist portion, the coupler having exhibited at least about 500 power transfer cycles during stretching formation of the waist portion, means for applying an optical signal to one end of one fiber, and means for monitoring an optical signal from the other end of one or both of the fibers, whereby pressure variation about the coupler can be monitored as a variation in coupling between said one and the other fiber.

14. An ambient pressure sensor comprised of an overcoupled fused biconical fiber optical coupler formed of at least a pair of parallel similar or dissimilar fibers, having exhibited at least about 500 power transfer cycles during stretching formation thereof.

15. An ambient pressure sensor comprised of an overcoupled fused biconical fiber optical coupler formed of at least a pair of parallel similar or dissimilar fibers, having exhibited several thousand power transfer cycles during stretching formation thereof.

16. An ambient temperature sensor comprised of an overcoupled fused biconical fiber optical coupler formed of at least a pair of parallel similar or dissimilar fibers, having exhibited at least about 500 power transfer cycles during stretching formation thereof.

* * * * *